Patented Dec. 3, 1929

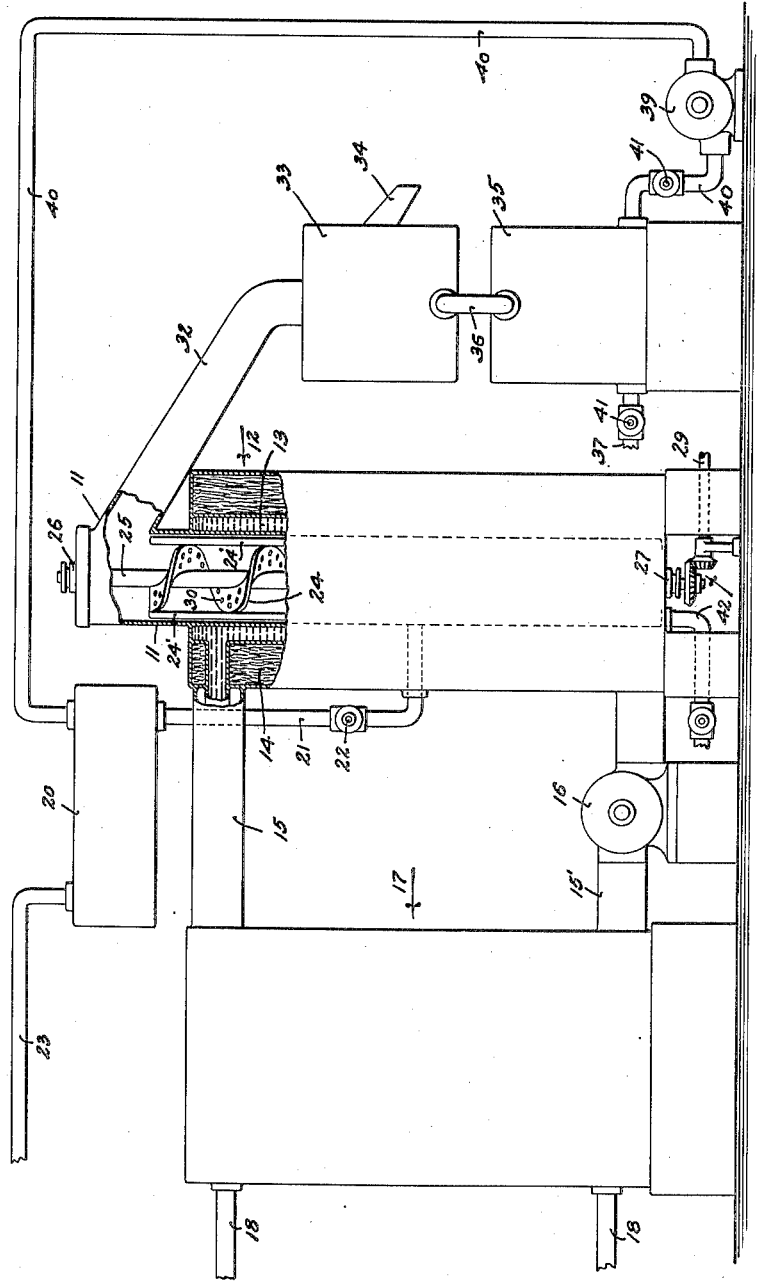

1,738,275

UNITED STATES PATENT OFFICE

ELBRIDGE BAKER, OF PASADENA, CALIFORNIA, ASSIGNOR OF FIFTY-ONE PER CENT TO G. AUSTIN HASKELL AND P. C. HOLLAND, BOTH OF LOS ANGELES, CALIFORNIA

COLD-MILK-DEHYDRATING PROCESS

Application filed December 28, 1927. Serial No. 243,022.

My invention relates to a new and novel process of producing condensed or concentrated milk, and is more particularly a process for dehydrating milk in which the water is separated from the milk solids by a carefully controlled freezing operation.

As is commonly known, the nutritional principles of milk, known as milk solids, are greatly diluted with water which, while necessary from a physiological standpoint, yet makes the food expensive to transport and store; normal milk contains about eighty-eight percent of water, which, in addition to its objectionable weight, is also objectionable in that it renders the fluid especially susceptible to contamination.

The dehydration of milk has, therefore, become an industry of great magnitude, and the economical production of a product of superior quality is of marked importance due to the scope of the industry and the utility of the product.

In the milk dehydration processes, as commonly used, the water is separated from the milk solids by evaporation, either through the use of elevated temperature, the circulation of hot air currents through the milk, subjecting the milk to high vacuum distillation, or various combinations of these processes, any one or all of which tends to leave a slightly scored taste in the finished product. Since the condensate must be cooled after being subjected to the heating operation, this is obviously a source of wasted heat energy.

It is an object of my invention to develop a process for dehydrating milk and an apparatus in which such a process may be carried out whereby the milk solids are separated from the water by a selective freezing operation. The water is removed in the form of ice and the milk solids remain in the resulting concentrate.

It is a further object of my invention to produce a concentrated milk product with greater economy, due to the obviation of wasted heat energy, than that which attends the production of this product in the commonly known processes.

A still further object of my invention is to develop a process whereby milk concentrate of superior quality may be produced through the elimination of any scorched flavor which results from heating the milk to elevated temperatures.

I have found that by cooling milk to a temperature corresponding to the freezing point of water, or between the freezing point of water (32° F.) and the solidification or congealing point of the milk solids (about 29° F.), and removing the resultant ice in a regulated manner, it is possible to obtain a milk concentrate having any desired water content. The product obtained is of marked superiority and the cost is obviously less than in the ordinary production of condensed milk. In addition to these advantages, the product has the natural taste of milk, which is highly important.

More particularly describing my process and a form of apparatus in which the process may be carried out (details of which are more fully described and claimed in my copending application, Serial No. 243,021, filed December 28, 1927,) the figure in the drawing is a diagrammatic view illustrating a form of apparatus used in concentrating milk by this method.

Numeral 11 indicates a tank which receives the milk to be concentrated, and which is mounted in a cooling tank 12. The cooling tank 12 may be of any type adapted for accurate temperature control, a preferred type comprising a brine chamber 13 externally provided with insulation 14. The brine chamber 13 is connected through circulating pipes 15, 15', and a pump 16 with a brine cooling tank 17 which may be provided with cooling means such as the ammonia coil 18.

The milk concentrating tank 11 is connected with a milk reservoir 20 by means of the pipe 21 which is provided with a valve 22, and the milk reservoir 20 is, in turn, provided with an inlet pipe 23.

Rotatably mounted in the concentrating tank 20 I provide a screw conveyor 24 which is mounted upon a shaft 25 supported in bearings 26 and 27. The shaft 25 is operated through gears 28, by a drive shaft 29, and it might be mentioned that for the most successful operation of this apparatus, the shaft 27 is to be rotated very slowly, at a preferred speed of about one revolution per minute, by any preferred means, not shown. For the purpose of preventing the formation of a layer of ice upon the inner surface of the concentrating tank 11, I may provide the conveyor 24 with a plurality of scraping blades 24' which engage the inner surface of the tank 11.

The screw conveyor 24 is provided with a plurality of small holes, indicated by numeral 30, which are adapted to permit the down flow of liquid but to prevent the downward passage of solid particles. It will thus be understood that the conveyor 24 acts to lift the ice from the liquid to the top of the tank where it is received by a chute or other means of conveyance, indicated at 32, through which it is carried to a centrifuge 33.

The centrifuge 33 separates the ice from any of the entrained milk concentrate which may have been carried over from the concentrator, the ice discharge is indicated at 34, and the milk is discharged into the "centrifuged milk tank" 35 through the pipe 36.

In case the concentrated milk collected in tank 35 is of the desired gravity, it is withdrawn through the outlet pipe 37 to a concentrate receiver, not shown. If, on the other hand, the contents of tank 35 are not of the required gravity, they are returned to the reservoir 20 by means such as the pump 39, and the pipes 40. The outlet pipes 37 and 40 of the tank 35 are provided with valves 41 for effecting the control of the discharge from the tank. The bottom of the concentrating tank 11 is provided with a valved discharge pipe 42 by means of which the concentrated milk is withdrawn when the desired gravity or concentration has been obtained by the removal of the frozen water.

It will be understood that the herein described apparatus, which is made the subject of a companion application for United States Letters Patent, Serial No. 242,021, filed December 28, 1927, is only a preferred type of apparatus by means of which this described and claimed process for concentrating milk may be effected. The process may be more specifically described as comprising the steps of cooling milk in any suitable receptacle to a temperature ranging between the freezing temperature of water and the solidification or congealing temperature of the milk solids and, during the cooling operation, removing the frozen water from the milk solution. This process may be carried to any extent, depending upon the concentration of milk desired in the product. I have obtained very satisfactory results in concentrating milk to 33% of its original volume.

The centrifugal separation of the ice and entrained milk concentrate is an essential step from the economic standpoint, but it will be understood that the majority of the milk concentrate is removed from the bottom of the concentrating receptacle, and while the form of apparatus illustrated is best adapted to intermittent or batch operation, it will be understood that through a careful manipulation of valves the process may be made continuous to produce concentrated milk of any desired gravity.

It is to be understood that while I have described the use of raw milk in my process, I may, as an initial step, remove the butter fat or cream from the milk before proceeding with my process as above described. This may be any well known separation method. The butter fat or cream so removed may be finally mixed with the concentrated milk product of the process.

I claim as my invention:

1. A process for concentrating milk which comprises: cooling milk to a temperature between the freezing point of water and the solidification point of the milk solids; and removing the frozen water from the mixture.

2. A process for concentrating milk which comprises: cooling milk to a temperature between the freezing point of water and the solidification point of the milk solids; removing the frozen water from the mixture; and subjecting said frozen water to an additional separation process for the removal of entrained milk.

3. A process for concentrating milk which comprises: placing said milk in a cooled receptacle; maintaining the temperature of said receptacle between the freezing point of water and the solidification point of the milk solids; and continuously removing the frozen water from the receptacle during the cooling operation until the ratio of milk solids is increased to the desired concentration.

4. A process for concentrating milk which comprises: cooling milk to a temperature below 32° F. and above 27° F. and removing the ice from the resultant mixture of ice and milk.

5. A process for concentrating milk which comprises: cooling milk to a temperature corresponding to the freezing point of water; and maintaining said temperature while removing the frozen water particles from said milk as they crystallize.

In testimony whereof, I have hereunto set my hand at Los Angeles, California, this 21st day of December, 1927.

ELBRIDGE BAKER.